Feb. 7, 1961  H. VISSERS  2,970,626
APPARATUS FOR BRUISING AND COMMINUTING GREEN FODDER
Filed Nov. 28, 1958

INVENTOR
HERBERT VISSERS
BY Emory L. Groff
ATTORNEY

United States Patent Office 2,970,626
Patented Feb. 7, 1961

2,970,626
APPARATUS FOR BRUISING AND COMMINUTING GREEN FODDER

Herbert Vissers, Nieuw Vennep, Netherlands, assignor to Landbouwwerktuigen- en Machinefabriek H. Vissers N.V., Nieuw Vennep, Netherlands Filed Nov. 28, 1958, Ser. No. 776,887

Claims priority, application Netherlands Dec. 14, 1957

1 Claim. (Cl. 146—186)

This invention relates to an apparatus for bruising and comminuting green fodder, and comprises a casing, provided with an inlet opening, a discharge opening and one or more conveying screws, one or more grids having substantially radially directed bars and one or more sets of rotating knives being located between said screw or screws and the discharge opening of the casing.

Apparatus of this kind are used for treating grass and similar long material to be ensiled. The degree of bruising the material then varies very considerably as young and tender grass can be bruised more easily than grass harvested in autumn as the stalks of said latter kind of grass can be much tougher.

The invention has for its object to provide simple means for varying the degree of bruising of the material to be treated into conformity with the nature of the material. According to the invention the bars of the grid or part thereof are adjustable in such a manner, that they may be angularly displaced so as to move them out of their radial position. According to the adjustment of the bars of the grid towards one or their other side of the radial position, the bruising action of the grid is increased or decreased.

Figure 1:
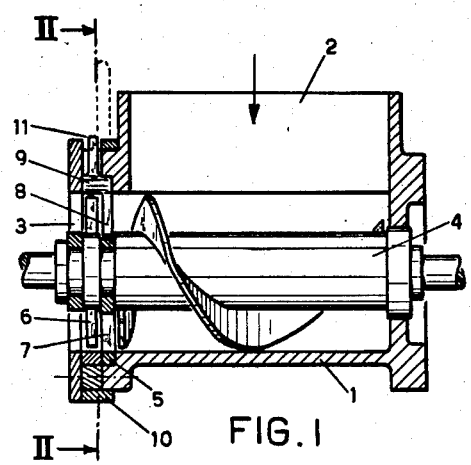
Figure 2:
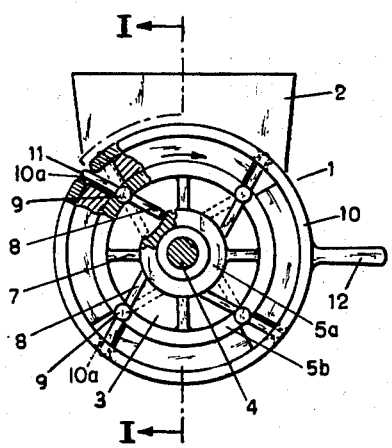

In the accompanying drawing which illustrates an embodiment of the adjustable grid bars according to the invention, Fig. 1 is a schematic longitudinal section of the apparatus taken on line I—I of Fig. 2.

Fig. 2 is a sectional view taken on line II—II of Fig. 1.

In the casing 1, which has an inlet opening 2 and a discharge opening 3, a conveying screw 4 is mounted, the pitch of which decreases towards the discharge opening.

Between the discharge opening 3 and the screw 4 a grid 5, having a hub 5a and a rim 5b, is arranged and located close to the inlet opening 2.

Behind the grid 5 radially directed knives 6 are secured to the shaft of the conveying screw.

The bars 7 of the grid are fixed between the hub 5a and rim 5b thereof, whereas the bars 8 of the grid are adjustably secured to the rim 5b by means of a journal 9. The bars 8 are mounted for rotatable adjustment and, as shown in the drawing, said bars are coupled to each other by means of a common adjusting ring 10 having openings 10a on one side thereof which receive and confine the ends 11 of the bars 8. As a convenient means of rotating ring 10 it is provided with a handle 12.

If the bars 8 of the grid are adjusted from the radial position to the full line position shown in Fig. 2 the material supplied by the conveying screw 4 is urged towards the hub 5a of the grid so that the bruising action is increased. If, however, the bars 8 are adjusted to the dotted line position shown in Figure 2, the material is urged towards the rim 5b of the grid so that the bruising action of the grid bars 8 is thus decreased.

Although only half of the grid bars are adjustable in the embodiment illustrated in the drawing, it is within the scope of the invention that more or less bars and, if desired, all bars of the grid may be adjustable.

What I claim:

A grid for use with a fodder bruising device including, a casing and a screw, said screw being rotatably mounted relative to said grid, said grid including a hub, a rim mounted on the casing, a movable ring concentric to said screw, and fixed bars interconnecting said hub and rim, at least one adjustable bar adjacent to at least one fixed bar, said adjustable bar having pivotal connection with said rim and operative engagement with said hub and said ring, whereby movement of said ring circumferentially of said screw will cause pivotal movement of said bar to change its angular relation with respect to said hub.

References Cited in the file of this patent

UNITED STATES PATENTS

| 1,628,998 | Rollman | May 17, 1927 |
| 1,647,196 | Rollman | Nov. 1, 1927 |
| 2,476,695 | Cadella | July 19, 1949 |

FOREIGN PATENTS

| 433,421 | Italy | Apr. 7, 1948 |